United States Patent Office 2,923,692
Patented Feb. 2, 1960

2,923,692

MUCILAGINOUS COMPOSITION COMPRISING SALT OF CROSSLINKED CARBOXYLIC POLYMER AND METHOD OF PREPARING SAME

Joseph F. Ackerman, Newport, Ky., and John F. Jones, Cuyahoga Falls, Ohio, assignors to The B. F. Goodrich Company, New York, N.Y., a corporation of New York No Drawing. Application January 25, 1954
Serial No. 406,058

20 Claims. (Cl. 260—17.4)

The present invention relates to dry mucilage-forming compositions and smooth, non-grainy aqueous mucilaginous compositions and to a method of preparing the same. More particularly, it relates to the preparation of mucilage-like compositions from a salt of a water-sensitive but water-insoluble cross-linked polymer of an olefinically unsaturated carboxylic acid monomer such as acrylic acid.

Many and varied substances have been utilized as thickening and bodying agents in such applications as printing pastes, textile sizes, latex creaming, latex coating and impregnating compositions, and in various medicinal and pharmaceutical applications such as creams, pastes, jellies, ointments and the like. Substances used as thickening agents are, in general, soluble in water and their function is to materially increase the viscosity or "thickness" of the liquid through a solution effect without substantial change in its flow properties, which are generally of the non-Newtonian or "pseudoplastic" type. Substances used as bodying agents, on the other hand, are generally more or less insoluble in water and produce compositions which are much more viscous than those secured with the same amount of mere thickening agents. In fact, such compositions are often so viscous as to have a gel-like structure, showing considerable elastic behavior and typical Bingham body flow (i.e. a definite yield point). In other words they form jelly-like or mucilage-type compositions. Typical thickening agents which are soluble in water are gum arabic, gum shiraz, starch, gluten and ordinary sugar, soluble alginates, polyvinyl alcohol, polyacrylic acid and its alkali salts, soluble cellulose derivatives such as carboxymethyl cellulose, and others. Commonly used bodying agents on the other hand are substantially insoluble natural gums such as gum karaya, gum tragacanth, gum bassora, locust bean gum, insoluble alginates, agar-agar, and others.

Naturally-occurring gum-like materials, which are substantially insoluble in water but which are so water-sensitive as to be highly swelled thereby, are somewhat disadvantageous as bodying agents because of their being variable in price and composition from season to season and from lot to lot due to variations in weather and methods of collection. In addition, they are not produced or handled under sterile conditions and, because they are nutrient substances, are susceptible to bacterial and fungal attack. Also they are produced at the present time in areas of the world where the political climate is not such as to guarantee a continuing and bountiful supply. Gum tragacanth, the best natural gum for applications where a smooth, non-grainy mucilaginous composition is desirable, is deswelled in the presence of acid or electrolyte, is in particularly short supply, and moreover, is among the most expensive of natural gums in use today.

Various synthetic materials and chemically modified natural products have in some measure been employed as natural gum substitutes but are not, in spite of their uniformity of properties and generally lower cost, considered to be the full equivalent of the natural gums in most of the important applications. Carboxymethyl cellulose, alginate derivatives such as sodium alginate, lignin derivatives, casein derivatives, modified starches and pectins, and others are typical materials which have been so employed with only moderate success. There exists, therefore, a great need for a readily available, inexpensive and acceptable, synthetic, water-sensitive, gum-like product.

It has been discovered that certain water-insoluble cross-linked polymers of carboxylic acids and anhydrides, and especially the salts thereof with monovalent bases or alkalis, are converted into mucilaginous compositions when swollen with water or other aqueous medium to a gel-like state and then mixed to a creamy consistency. Mucilaginous compositions prepared in this manner, however, frequently are "grainy" in nature, possess low yield points, are low in viscosity and are generally of unpredictable behavior from batch to batch. Elimination of this behavior would make possible the production of excellent, smooth, and non-grainy mucilaginous compositions from these insoluble, but highly hydrophilic, carboxylic polymers and their salts.

We have now discovered that excellent, smooth, non-grainy and uniformly high viscosity mucilage and mucilaginous compositions are produced from the insoluble but high-swelling carboxylic polymers by a method in which the polymer is first prepared by polymerization of a substantially anhydrous carboxylic acid in an organic solvent or medium in which the monomer is more or less soluble but in which the polymer is not swelled to any substantial extent, such as any of the aliphatic or aromatic hydrocarbons, the polymer then mixed with water or other aqueous medium and neutralized in situ with monovalent alkali such as ammonium hydroxide and the alkali-metal hydroxide and carbonates, or an amine having not more than one primary or secondary amine group, to form the corresponding polymer salt, and finally dispersing the polymer or salt thereof in water to permit maximum swelling thereof and to blend and colloidally disperse the polymer salt and effect its conversion to a smooth, non-grainy mucilaginous composition of maximum viscosity.

It has been discovered that the reason for the superior properties noted in the mucilages prepared by the method of this invention is that the colloidal swelling properties of the insoluble carboxylic polymers are permanently impaired if once swollen and deswollen before conversion to a mucilage. This is true of both the acid-form polymer and of its alkali-metal, ammonium and amine salts and it is also true whether the polymer is swollen in water or in an organic solvent having a substantial swelling action on the polymer such as dioxane or acetone. When the once-swollen-and-deswollen polymer or salt is again swollen in water, aqueous alcohol or glycerol, or dioxane, the individual particles tenaciously retain their identity and generally are plainly visible to the naked eye. The resin particles do not blend one with the other and the viscosity of the mucilage, therefore, is low. Such a mucilage appears and "feels" grainy when spread thinly or rubbed between the fingers. It is not possible, ordinarily, to eliminate this graininess entirely by finer grinding of the dry polymer or salt. The viscosity of the mucilage in very case is drastically reduced no matter how fine the polymer is reground, as compared to a similar mucilage prepared from the same polymer but before swelling, deswelling and regrinding. In fact, the finer the once-swollen-and-dried polymer or salt is reground, the lower the mucilage viscosity. Consequently, it is of paramount importance not to subject the polymer to deswelling action before use.

The insoluble but water-sensitive (high-swelling) polymers utilizable in this invention essentially are modified polymerized unsaturated acids or anhydrides containing sufficient cross-linking to be insoluble in water, dioxane, and organic solvents but which are not so closely knit together through cross-linking to impair the hydrophilic ionic character of the carboxyl groups or carboxyl-salt groups. They are produced by the polymerization of two essential ingredients, one being an olefinically-unsaturated carboxylic acid containing at least one activated olefinic carbon-to-carbon double bond (so as to be polymerizable), as hereinafter more fully defined, such as acrylic acid, methacrylic acid, and other acrylic acids, crotonic acid, maleic acid, maleic anhydride, sorbic acid, and many others, and the other of which is a very small amount of a cross-linking agent, which is a compound (not necessarily monomeric in nature) copolymerizable with carboxylic monomers containing a plurality (more than one) of polymerizable $CH_2=C<$ groupings per molecule. For the purposes of this invention polymers made by the polymerization of monomeric mixtures containing an unsaturated carboxylic acid halide such as acrylyl chloride and a suitable amount of cross-linking agent are fully equivalent in the method of this invention, when hydrolyzed in water, to the polymers prepared from the corresponding carboxylic acid or anhydride.

The term "carboxylic acid" as used herein includes the carboxylic acids, their acid halides, and their anhydrides wherein the anhydride linkage is formed by the elimination of water from carboxyl groups on the same molecule of polycarboxylic acid. The carboxylic acid anhydrides formed by the elimination of water from two or more molecules of the same or different carboxylic acids are not included within the scope of the invention because such anhydrides form cross-linked polymers which are readily hydrolyzed in water or aqueous alkali and which suffer a marked degradation in molecular weight such that a mucilage therefrom continues to drop in viscosity until all anhydride cross-linkages are broken.

As stated above, the carboxylic acids utilizable in producing the mucilage polymers for use in this invention must contain at least one activated carbon-to-carbon olefinic double bond, that is, a double bond present in the alpha-beta position with respect to a carboxyl group thusly $$\overset{H}{-C}=\overset{H}{C}-COOH$$

or present attached to a terminal methylene grouping thusly

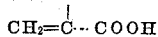

Included within this broadest class of carboxylic acids are such widely divergent materials as the acrylic acids such as acrylic acid itself, methacrylic acid, ethacrylic acid, alpha- and beta-chloro, -bromo, and cyano acrylic acids, crotonic acid, beta-acryloxy propionic acid, alpha- and beta-vinyl acrylic acids, alpha- and beta-styryl acrylic acids, alpha-beta isopropylidene propionic acid, sorbic acid, cinnamic acid, maleic acid, fumaric acid, itaconic acid, mesaconic acid, aconitic acid, maleic anhydride and other anhydrides of the general structure

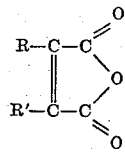

wherein R and R' are selected from the group consisting of hydrogen, halogen and cyanogen ($-C \equiv N$) groups, and alkyl, aryl, alkaryl, aralkyl, and cycloaliphatic radicals and also hydromuconic acid, glutaconic acid, 3-carboxy pentadiene-(2,4)-oic-2, muconic acid, and many others.

It is preferred to utilize the alpha-beta, monoolefinically unsaturated carboxylic acids in the production of the mucilage polymers for use in this invention. Illustrative alpha-beta mono-unsaturated carboxylic acids of this preferred class are the acrylic acids as disclosed elsewhere herein, crotonic acid, alpha-butyl crotonic acid, angelic acid, hydrosorbic acid, cinnamic acid, m-chloro cinnamic acid, p-chloro cinnamic acid, umbellic acid, maleic acid, fumaric acid, itaconic acid, mesaconic acid, aconitic acid and hydromuconic acid, glutaconic acid, and others.

It is even more preferred to utilize polymers of the acrylic and alpha-substituted acrylic acids having the structure $$CH_2=\overset{X}{\underset{|}{C}}-COOH$$

wherein X is selected from the class consisting of hydrogen, halogen hydroxyl, carboxyl, amide, ester, lactone, lactam, and the cyanogen ($-C \equiv N$) groups, and alkyl, aryl, alkaryl, aralkyl, and cycloaliphatic radicals. Illustrative acids of this most preferred group include acrylic acid itself, alpha-chloro acrylic acid, alpha-bromo acrylic acid, alpha-cyano acrylic acid, methacrylic acid, ethacrylic acid, alpha-phenyl acrylic acid, alpha-benzyl acrylic acid, alpha-cyclohexyl acrylic acid, and others. Of these acids acrylic acid itself is most preferred because of its ready availability, lower cost, and ability to produce the best polymers.

The cross-linking agent useful in the production of the insoluble, water-sensitive polymers adapted for use in the method of this invention may be any compound, not necessarily monomeric in nature, which possesses a plurality of polymerizable $CH_2=C<$ groupings. Polyunsaturated hydrocarbons, esters, nitriles, acids, polyunsaturated acid anhydrides, ethers, ketones, alcohols and polyunsaturated compounds of this class incorporating one or more of these and other functional groups are utilizable. Illustrative cross-linking agents of this broad class include the polyunsaturated hydrocarbons such as divinyl benzene, divinyl naphthalene, low molecular weight (soluble) polymerized dienes such as polybutadiene and other open-chain, aliphatic, conjugated diene polymers; di- and poly-unsaturated esters such as ethylene glycol diacrylate, ethylene glycol dimethacrylate, glyceryl di- and tri-acrylates, allyl acrylate, methallyl methacrylate, crotyl acrylate, allyl cinnamate, diallyl oxalate, diallyl phthalate, monoallyl maleate, diallyl maleate, diallyl malonate, diallyl allyl malonate, di- and tri-allyl citrates, and many others; polyunsaturated acids such as alpha-beta-isopropylidene propionic acid, alpha-beta-(2-propene) propionic acid, and others; polyunsaturated acid anhydrides such as acrylic anhydride, methacrylic anhydride, and others; polyunsaturated ethers such as divinyl ether, diallyl ether, dimethallyl ether, diallyl ethylene glycol ether, diallyl and triallyl glycerol ether, diallyl 1,2-propanediol ether, diallyl 3-butene-1,2-diol ether, diallyl and triallyl ethers of 1-phenyl-1,2,3-propanetriol, diallyl 1,5-naphthalenedimethylol ether, di-, tri- and tetra-allyl 1,4,5,8-naphthalene tetrol ethers, the vinyl, allyl, methallyl and crotyl polyethers containing 2 to 7 or more alkenyl ether groups per molecule made from polyhydric alcohols such as the carbohydrate sugars and the so-called "sugar alcohols" including erythritol, pentaerythritol, arabitol, iditol, mannitol, sorbitol, inositol, raffinose, glucose, sucrose, and others; polyunsaturated ketones such as divinyl ketone, diallyl ketone (di-2 propenyl ketone), and others; polyunsaturated compounds containing one or more functional groups such as the half ethers, allyl beta-allyloxy propionate and allylmethacrylyl sucrose, the half ester, monoallyl maleate, the partial allyl ethers of polyhydric alcohols such as triallyl pentaerythritol ether, sulfur-containing compounds such as hexa allyl trimethylene trisulfone, and others.

Some of the well-known cross-linking agents, for example certain of the polyunsaturated esters and ethers listed above such as ethylene glycol dimethacrylate or diallyl oxalate and the divinyl and diallyl ethers, produce a polymer which is considerably lower in molecular weight and contains considerably less gel structure than would be expected. Moreover, when such polymers are converted to strongly ionized alkaline salts a mucilaginous composition thereof appears to decrease somewhat in viscosity and gel-like character upon aging, a phenomenon believed due to hydrolysis of the divinyl or diallyl ether and ester-type linkages. It has been found that insoluble, water-sensitive polymers of superior stability (resistance to acid or alkaline hydrolysis) are produced by the use, as cross-linking agents, of the polyunsaturated hydrocarbons such as divinyl benzene and the diene polymers, and surprisingly, certain of the polyalkenyl polyethers of polyhydric alcohols, all of which contain a plurality of non-conjugated $CH_2=C<$ groupings per molecule.

Particularly preferred cross-linking agents because of their ready reactivity with unsaturated carboxylic acids and their ability to produce cross-linked carboxylic-type gels of great resistance to hydrolysis are the polyalkenyl polyethers of polyhydric alcohols containing more than one, and preferably two or more $CH_2=C<$ groupings (or alkenyl ether groups) per molecule, which polyethers are made from a parent polyhydric alcohol containing at least 4 carbon atoms and at least 3 hydroxyl groups. Compounds of this class are readily produced by a Williamson-type synthesis in which an alkenyl halide such as allyl chloride, allyl bromide, methallyl chloride, methallyl bromide, crotyl chloride and others, is reacted with a strongly alkaline aqueous solution of one or more polyhydric alcohols. This class includes such alcohols as the butane triols, erythritol, the aldotetroses such as erythrose and threose; ketotetroses such as erythrulose; aldopentoses such as arabinose, xylose, lyxose and ribose; ketopentoses such as araboketose and xyloketose; aldohexoses such as glucose, galactose, mannose, gulose, idose, talose, allose and the like; ketohexoses such as fructose or levulose, sorbose and the like; other sugars including the disaccharides, trisaccharides and polysaccharides such as sucrose, maltose, lactose, raffinose, alpha-methyl glucosides, the galactomannan and glucomannan gums and starch; reduced or alcohol forms of these and other sugars such as erythritol, xylitol, mono-, di- and tri-pentaerythritol, arabitol, mannitol, iditol, talitol, sorbitol, inositol, dulcitol, and others; and the acyl- or amino-substituted polyhydroxy compounds such as acetylated sucrose, galactamine, glucosamine, fructose amine and others. Specific polyether-type cross-linking agents of this class include di- and tri-, allyl and methallyl ethers of the butane triols, di-, tri-, tetraallyl- and tetramethallyl ethers of erythritol, di-, tri-, tetra-, pentaallyl- and pentamethallyl ethers of xylitol and of mono-, di-, and tri-pentaerythritol, di-, tri-, tetra-, and pentaallyl ethers of arabitol, pentaallyl dulcitol, hexaallyl dulcitol, hexaallyl talitol, hexaallyl iditol, tetraallyl allitol, pentaallyl and pentamethallyl ethers of fructose, sorbose, and sorbitol, allyl, methallyl and crotyl polyethers of sucrose, glucose, maltose, lactose, raffinose and others, and the mixed allyl, methallyl and crotyl polyethers of the above and other polyhydric alcohols. A greatly preferred class of polyhydric alcohols are the "oligosaccharides," that is, compounds containing from 1 to 4 saccharide units, and their oxidation and reduction products in which the original saccharide unit is not broken. The vinyl ethers of the above polyhydric alcohols, which are made by a Reppe-type vinylation synthesis with acetylene are also utilizable as polyalkenyl polyether cross-linking agents.

In the preparation of the preferred class of polyalkenyl polyether cross-linking agents it is possible to completely etherify the polyhydric alcohol with all hydroxyls reacted. Usually, however, the reaction product is a complex mixture of polyalkenyl polyethers, even when a large excess of the alkenylation agent is employed. In such cases analysis reveals only the average number of alkenyl ether groups and unreacted hydroxyl groups per molecule in the product. These mixtures produce insoluble carboxylic polymers when the average number of alkenyl ether groups is greater than one, although it is preferred to use those containing an average of two or more alkenyl ether groupings per molecule. Specific compounds of this class which have been prepared in addition to those partial polyethers listed above are a polyallyl sucrose polyether analyzing as containing on the average 5.6 allyl groups and 1.97 hydroxyl groups per molecule, polymethallyl sucrose polyether containing 7.5 methallyl groups per molecule, polyallyl sorbitol polyether containing an average of 4.7 allyl groups and 0.97 hydroxyl group, polyallyl sorbitol polyether containing 3.71 allyl groups and 1.02 hydroxyl groups, the polyallyl polyether of mono-pentaerythritol containing an average of 2.78 allyl groups and 0.68 hydroxyl group, polyallyl inositol polyether containing an average of 4.11 allyl groups and 0.84 hydroxyl group, polyallyl raffinose polyether prepared from raffinose pentahydrate, polycrotyl sucrose polyether and others. The polyallyl polyethers of sucrose are most preferred because of their lower cost, ease of preparation, and ability to form polymers of great utility for use in mucilaginous compositions. Polymers of this latter type are disclosed and claimed in the copending application of Harold P. Brown, Serial No. 307,711, filed September 3, 1952. The preparation of monomers of this class are described in Ind. and Eng. Chem., vol. 41, pp. 1697 to 1700.

The composition of the monomeric mixture utilized in the production of the insoluble but high-swelling carboxylic acid polymers may vary considerably, within limits, but must contain not less than 0.1% by weight of the total monomers and not more than 10.0%, preferably not more than 6% of the cross-linking agent in order to produce the desired water-insolubility and water-sensitivity (or high-swelling characteristics). This means in a two-component interpolymer or copolymer that the remainder of the monomeric mixture will consist of 90 to 99.9% by weight, and preferably 94 to 99.9% of the carboxylic acid. A preferred range of cross-linking agent for acrylic type acids is 0.1 to 4.0% and even more preferred, 0.2 to 2.5% by weight of the total monomers. It should be realized that the precise amount of any cross-linking agent within these ranges to be utilized will depend first on the characteristics desired in the polymer and also on the particular polymerization solvent or medium employed. The solubility of the monomeric mixture, and particularly of the cross-linking agent, in the polymerization medium appears to have a considerable effect on the amount and distribution of cross-linking obtained with a given amount of cross-linking agent within the above broad range.

Similarly, the amount of cross-linking agent within the above range to be utilized to secure the necessary water-insolubility and high-swelling characteristics also is in some measure determined by the temperature of polymerization and catalyst concentration. The lower the reaction temperature and catalyst concentration the longer will be the polymer chains and proportionally less cross-linking agent will be required while the higher reaction temperatures and catalyst concentrations produce shorter polymer chains which require more cross-linking agent for insolubility. Reaction temperatures of 0 to 100° C. may be utilized, with 30 to 70° C. being particularly preferred.

It is possible, however, to replace a substantial proportion of the carboxylic acid with one or more other monomers without destroying the hydrophilic, water-sensitive character of the polymer. With hydrophobic monomers, that is monomers which by themselves polymerize to produce hydrophobic or water-insoluble or water-insensitive polymers, it is possible to replace, on a molar basis, up to about one-half or slightly more of the carboxylic monomer. Styrene, vinyl and acrylic esters, vinylidene chloride, acrylonitrile, methacrylate esters, and the like are, according to this classification, hydrophobic monomers. With hydrophilic monomers, that is monomers which by themselves polymerize to produce water-soluble or water-sensitive polymers, it is possible to replace a more substantial proportion of the carboxylic monomer, a preferred range being, on a molar basis, up to 100% (an equi-molar basis), of the carboxylic monomer. N-methyl acrylamide, methyl vinyl ether, ethyl vinyl ether and N-butyl vinyl ether, for example are classified as hydrophilic monomers because by themselves they produce water-soluble or water-sensitive polymers or polymers which readily hydrolyze in water or under aqueous alkaline or acidic conditions to produce water-soluble or -sensitive polymers. Particularly preferred multi-component interpolymers are the tripolymers produced from monomeric mixtures consisting of 90 to 95% by weight of an acrylic acid, 4.9 to 9.9% of an additional monomer such as styrene, N-methyl acrylamide, methacrylamide, methyl vinyl ether and the like, and 0.1 to 4% by weight of a polyallyl polyether of sucrose.

Other monomers utilizable in the production of multi-component interpolymers include vinyl acetate, vinyl chloroacetate, methyl acrylate, alpha-cyano methyl acrylate, alpha-chloro methyl acrylate, 2-ethylhexyl acrylate, lauryl methacrylate, acrylonitrile, methacrylonitrile, acrylamide, vinyl chloride, vinylidene chloride, vinyl pyridene, vinyl carbazol, vinyl pyrrolidone, vinyl benzoate, vinyl methyl ether, vinyl butyl ether, and other vinyl alkyl ethers, ethylene, isobutylene, diethyl maleate and many others.

As indicated above, the particular method or technique employed in the preparation of the polymer has considerable effect on the water-sensitivity and colloidal gel-like properties of the polymer. Polymerization of a substantially anhydrous monomer mixture in a hydrocarbon solvent for the monomers but non-solvent for the polymer or in a mixture of such solvents containing a solvent-soluble peroxygen catalyst or other so-called "free-radical" type of catalyst is required, the product obtained being a very fine and often fluffy precipitate which, after solvent removal seldom requires further grinding or other treatment for use in the method of this invention. Suitable solvents include benzene, toluene, xylene, hexane, heptane, methyl chloride, ethyl chloride, carbon tetrachloride and other aliphatic and aromatic hydrocarbons, and mixtures of these and many other hydrocarbon solvents.

Polymerization in an organic solvent may be carried out in a closed vessel under pressure or under reflux at atmospheric pressure. Polymerization in a solvent medium such as benzene, hexane or heptane under reflux at 50 to 85° C. under atmospheric pressure using a solvent-soluble peroxygen catalyst will generally bring about a polymer yield of 75 to 100% in less than 10 hours, usually in less than 5 hours. The polymerization rate is ordinarily faster in the absence of atmospheric oxygen so that the reaction is preferably carried out in an evacuated vessel or under an inert atmosphere such as that of a volatile monomer or nitrogen and the like.

The water-insoluble but highly water-sensitive cross-linked acrylic acid polymers do not attain their greatest water-sensitivity in the acid-form. Partial neutralization with monovalent alkalis such as sodium, potassium, or ammonium hydroxides or carbonates and the like causes the polymers to swell very greatly in water, to acquire greatly increased viscous demulcent properties, and to exhibit a more desirable pH. For example, neutralization with sodium hydroxide to the extent of 10% raises the pH of the polymer mucilage from about 2.5 to about 3.5, 25% neutralization raises it to about 4.0, 55% to a pH of about 6.0, 75% to a pH of about 7.0 and 85% to a pH of about 9.0 or slightly higher. The mucilage viscosity of these polymers also increases rapidly and reaches a maximum in the range of 25 to 85% neutralization, and then falls off, some times quite rapidly, as complete neutralization is approached. Since mucilaginous compositions of this invention exhibiting a pH of 4 to 9 (a pH range tolerated by human tissue) possess demulcent properties to a high degree, it is preferred to neutralize to the extent of 25 to 85%.

Neutralization of the acidic polymer is preferably carried out using water-soluble monovalent alkalies such as sodium, potassium, lithium and ammonium hydroxides, carbonates, bicarbonates, oxides and others, or with amine bases having not more than one primary or secondary amino groups. Polyvalent bases such as calcium hydroxide and in fact any polyvalent metal cation have a powerful deswelling action on the mucilaginous composition and accordingly are not desirable. It has been noted, however, that the acid polymers may be neutralized to the extent of as much as 5 to 20% with a polyvalent metal hydroxide, usually about 10%, together with 25 to 75% of a monovalent hydroxide such as sodium hydroxide in which form they are nevertheless highly swelled and are possessed of sometimes desirable altered viscosity characteristics. Sequestering agents may be added to the mucilaginous compositions to minimize the effects of trace amounts of polyvalent metal ions inevitably present in water or with which the composition comes in contact during use.

In the practice of the method of this invention the acid form of the polymer, is ordinarily freed of solvent, and then subdivided by grinding and the like, if desired, to as fine a powder as possible. Generally, mucilages made with acid-form polymer having a substantial proportion (i.e. 25% or more) of particles larger than 100 mesh, U.S. standard, is grainy and has an an unsatisfactorily low viscosity. It is greatly preferred to utilize polymers having particles 100 to 325 mesh or finer. The solvent-nonsolvent polymerized polymers of this invention are friable and are easily ground to fine powders in any conventional apparatus such as a ball mill. The fine precipitate obtained directly from the polymerization step, particularly from a polymerization conducted with a monomer concentration of 1 to 20% in benzene, heptane, hexane or other hydrocarbon solvent, is usually sufficiently fine (i.e. finer than 325 mesh) for most purposes without grinding.

The finely-divided acid form polymer is then mixed with water or a suitable aqueous medium to put it in condition for neutralization. Since the polymer is insoluble a granular dispersion results which after continued mixing gradually thickens and gelatinizes. The neutralization may be simultaneous with or subsequent to the mixing of the polymer with water. For example, the finely-divided acid-form resin may be mixed with a basic aqueous solution of the neutralizing agent or the neutralizing agent may be added subsequent to swelling of the acid-form polymer. However, a much preferred method of neutralizing is to mix the finely-divided acid-form resin with a pulverulent anhydrous form of the neutralizing agent such as sodium hydroxide or carbonate and the composite dry mix then mixed with water. Since the neutralizing agents readily utilizable in the solid form, namely the alkali hydroxides and carbonates, are readily soluble in water they need only be crushed sufficiently fine to insure their ready solution when the dry mixture is added to the aqueous medium. No reaction occurs in the dry pulverulent mixture and it may be stored indefinitely in the dry form. Moreover, the use of the powdered mixture of acid-form polymer and pulverulent neutralizing agent is simple and eliminates the preparation of a separate neutralizing solution and the sometimes difficult operation of working the neutralizing agent or solution thereof into the partially or completely gelatinized acid-form polymer. To all intents and purposes the powdered mixture may be used in the same manner as any of the natural gums such as agar-agar, gum karaya or gum tragacanth, etc. Agitation, grinding, homogenizing or beating of the highly swollen polymer salt converts it into a uniform mucilage. In small quantities the agitation may be performed with a mortar and pestle and in larger quantities in any type of commercial mixer, homogenizer or colloid mill.

In the preparation of the mucilaginous compositions of this invention, proportionately less of the water-sensitive polymer salt is required than of any of the natural gum bodying agents. For example, 0.10 to 1.5% (as the 75% neutralized sodium salt) of a copolymer of acrylic acid with divinyl benzene or allyl sucrose produces a mucilage of the same or greater viscosity than approximately twice that quantity of the best and most expensive natural bodying agent, gum tragacanth. In general 0.1 to 10% by weight of the polymer salt, based on the total of resin and water is sufficient to produce mucilaginous or jelly-like compositions ranging from very soft to very firm in consistency. For most common purposes it is preferred to utilize only 0.20 to 5% of the polymer salt.

Almost any ingredient commonly added to mucilaginous compositions may be added to the mucilage before, during or after neutralization and agitation. For example, if the mucilage is for medicinal use, any pigments, dyes, oils, waxes or fillers, and perfumes, sugars or other taste and smell masking agents, bactericides, fungicides, spermicides, germicides, antiseptic agents, anesthetics, emulsifiers, lubricants, stabilizers or other diluents or medicaments may be added to the aqueous medium or to the mucilage and dispersed or ground therein with further mixing. For example, many medicinal preparations for application to human or animal tissue, such as ointments or creams, contain a small amount of a local anesthetic to ease the pain together with another active agent or agents to promote healing, softening, etc. As a further example, a tooth paste contains one or more soluble or insoluble polishing agents, antiseptics such as an ammonia-liberating agent, and a taste-masking agent such as sugar, saccharin, etc. Vaginal and surgical jellies contain little else than a stabilizer, germicide, bactericide or spermicide. Glycerin may be used in any of these applications as a hygroscopic diluent to prevent drying.

The following specific examples, which are merely illustrative of the invention, will demonstrate the preparation of illustrative polymers and various manners of utilizing them in the preparation of mucilaginous compositions.

Example I

A mixture of 97.5% by weight of anhydrous acrylic acid and 2.5% divinyl benzene is polymerized in a refluxing 1 to 1 hexane-heptane mixture using the following materials:

| Materials | Parts by Weight |
|---|---|
| Acrylic Acid | 97.5 |
| Divinyl benzene (50% pure) | 5.0 |
| Heptane | 250.0 |
| Hexane | 250.0 |
| Caprylyl peroxide | 0.721 |

Under reflux at atmospheric pressure the polymerization proceeds to a yield in excess of 80% in 3.3 hours. The product is a very fine fluffy precipitate (1 pound thereof fills a one-gallon container), which requires only to be filtered off and freed of solvent by drying at moderate temperatures. The thus-formed acid polymer has a swelling index in distilled water of 95 (ratio of the weight of the swollen gel to that of the dry polymer). When converted to the salt by neutralization to the extent of 25 to 85% with sodium hydroxide (pH about 4.0 to 9.0) the polymer exhibits a swelling index in excess of 250.

By way of comparison, a mucilage is made from a 75% sodium salt of a similar cross-linked polymer made by polymerization in water, neutralizing to the 75% sodium salt and drying, and then redispersing in water with stirring until a gelatinous product is obtained after which the gelatinous product is ground and thoroughly mixed in a mortar and pestle to insure complete swelling and dispersion. No matter how thoroughly ground, the mucilage can not be spread out into a thin film between the fingers for the individual lumps or grains of swollen gel are detected by feel and sight. The viscosity of the resulting mucilage, having a 1% concentration of the salt, is measured on the Interchemical rotational viscosimeter at 25° C., the cup speed being varied from 0 to 200 r.p.m. and the viscosity read from the slope of the straight line portion of a plot of the deflection versus r.p.m. and converted to centipoises. The value so obtained is found to be 33.5 cp. The x-intercept of the linear portion of the curve is taken as the yield point and is found to be 24 dynes/sq. cm.

In contrast, a composition made by mixing sufficient of the fine hydrocarbon polymerized, acid-form polymer precipitate with water containing sufficient sodium hydroxide to produce a concentration of 1% of the 75% sodium salt is similarly mixed and ground to insure complete swelling. The result is a fine, smooth and non-grainy mucilage which may be spread into a thin film between the fingers with no lumps or graininess being detected by sight or touch. The viscosity, as determined before, of this mucilage is 105 cp. and the yield point is 140 dynes/sq. cm. Thus, the polymer salt produced in situ from the hydrocarbon polymerized polymer produces a mucilage which is not only smoother and free of graininess but which is more than four times as viscous as the mucilage containing the polymer salt which has been once reduced to dryness and reground. The reasons for this phenomenon are not understood and may be due to some obscure structural change or change of colloidal nature.

Example II

A polymer is made from 97.5 parts acrylic acid and 2.5 parts divinyl benzene by polymerization at 74° C. under reflux in a 1–1 hexane-heptane mixture with gradual addition of the mixed monomers to the reaction vessel over a 3-hour period. The polymer obtained is compared to gum tragacanth as to comparative viscosity and flow characteristics, and as to general demulcent and dispersion power in a typical mucilage-like application such as a tooth paste. Tooth pastes are prepared from the in situ neutralized 75% sodium salt of the polymer and from gum tragacanth, the dispersing medium in each case being a 40% aqueous glycerol solution containing 17 volume percent of calcium carbonate. The ingredients are ground to homogeneity in a mortar and pestle. The tooth pastes are substantially identical in appearance and feel. The viscosity characteristics under different rates of shear measured by the Brookfield viscometer show that the thixotropy of the pastes containing the polymer salt and gum tragacanth are of the same order. When these pastes are aged and their viscosity measured at various time intervals by a test in which a quantity of the paste is mounted on a rotatable stage fitted with a dial to measure the degree of rotation, a thin blade supported by a tortion wire is inserted in the paste and the stage rotated at such a rate as to allow the blade to hold its original position. The time interval for a 20° rotation of the stage is taken as the viscosity. Both pastes reach a steady state viscosity of the same order within two hours, although of the two the gum tragacanth paste shows a tendency to increase in initial viscosity more rapidly. The time for a given quantity of each paste (after aging) to flow from an orifice under the same load is identical.

Example III

Copolymers of acrylic acid and a polyallyl sucrose polyether (which will be referred to as "allyl sucrose") containing 6.08 allyl groups/molecule ($N_d^{20}=1.4895$) are prepared by refluxing in a 1/1 hexane/heptane mixture in the presence of 0.75 part/wt. per 100 of monomers of caprylyl peroxide, 10% of the allyl sucrose being charged initially with the acrylic acid while the remaining 90% is proportioned in a continuous manner over a period of reaction of 60 to 85 minutes. After all of the polyallyl sucrose is added, an additional period of reflux of 15 minutes is allowed for completion of the reaction. The yield in all cases is in the range of 80 to 93% in 75 to 100 minutes' total reflux time. The resultant fine polymer-solvent slurry is then diluted with additional solvent to facilitate filtering and the polymer is washed on the filter press with additional quantities of solvent. Upon oven drying, fine, uniform and friable powders are obtained.

The polymers are compared to commercial gum tragacanth as a bodying agent for tooth pastes. The polymers are compounded into plain aqueous mucilage by dry-mixing with sodium hydroxide pellets and then into tooth pastes according to the following recipe:

25 parts of $NaPO_2$ (insol.)

25 parts of $CaHPO_4 \cdot 2H_2O$ 50 parts of 40% aqueous glycerol 2 parts of a surface-active agent [1]

1.5 parts of 75% sodium salt of insoluble acrylic acid copolymer

[1] A sodium sulfate type.

In the preparation of these mucilaginous compositions, the polymer is first swollen in part of the water, the required amount of NaOH added as a solution in the remainder of the aqueous medium and the mixture then agitated or ground in a mortar to insure homogeneity and good dispersion. The solid ingredients of the paste formulation are then added and the mixture mixed again as before. In all cases a creamy composition results which is easily spread into a thin coherent film.

The cohesive power of the tooth pastes is measured by pulling a small, thin metal disk from a paste surface and measuring the force required. In this test a layer of paste about ⅜" thick is spread on a clean glass surface and an aluminum disk 1½ in. in diameter is embedded to about one-half the depth. The disk is attached with a hook to a sensitive spring scale of about 2 lbs. capacity. The scale is then pulled upwards at a slow constant rate of about 3–4 mm./sec. by means of a pulley and a geared-down motor. The scale reading when the disk breaks free from the paste is the cohesion value expressed in ounces. The plain mucilages and the toothpastes are tested for suspension stability by centrifuging for 10 minutes in a small angle centrifuge operated at 3500 r.p.m. The suspension is classed as excellent when no separation of phases is visible, good when only a drop or two of clear serum is noted, and only fair when a noticeable clear layer separates out. The physical properties of the composition are summarized as follows:

| Polymer—Parts Allyl Sucrose | Mucilage Viscosity—Poises | | | Tooth Paste | |
|---|---|---|---|---|---|
| | Conc. | | | Cohesion at 1.5% Conc. | Suspension |
| | 0.5% | 1.0% | 1.5% | | |
| A—1.0 (80% Conv.) | 250 | 350 | 444 | 5.5–6.0 oz | Good. |
| B—1.5 (82% Conv.) | 240 | 760 | >1,000 | 8–9 oz | Excellent. |
| C—1.5 (92% Conv.) | 280 | 560 | 660 | 6 oz | Excellent. |
| D—2.5 (80% Conv.) | 60 | 390 | >1,000 | 7 oz. (at 1.25% con.). | Fair. |
| Commercial Tooth Paste (2% tragacanth). | | | | 6 oz | Good. |

The significance of the above data is that proportioning in the polyallyl sucrose monomer in aliphatic hydrocarbon solvent produces a polymer which has both good cohesion and high suspending power. It also demonstrates that acrylic acid allyl sucrose copolymers produce mucilaginous compositions which are equivalent or superior in most respects to those made with as much as twice as much gum tragacanth.

A similar polymer is made by charging a mixture of 98.5 parts by weight of acrylic acid and 0.15 part of allyl sucrose (5.6 allyl groups) to a 1 to 1 mixture of hexane and heptane. The resulting solution is warmed to the reflux point (76 to 76.5° C.) and gradual addition of allyl sucrose is begun at the end of 15 minutes when heat evolution is noted. Over a period of one hour an additional 1.35 parts of allyl sucrose are added. In a total of 75 minutes at reflux a yield of polymer of 94.6% is obtained. The polymer is obtained as a very thick, viscous slurry which is diluted with hexane, filtered in a plate and frame press and washed with further quantities of hexane. The filter cake is dried under vacuum at 60° C. and then ball milled to pass a 100 mesh screen. Mucilages are made by mixing the dry acid-form powder with powdered sodium hydroxide so as to produce upon mixing with water 0, 25, 50, 75 and 100% neutralized polymer. The viscosity of these smooth, non-grainy mucilages are determined on the Interchemical viscometer operated at 100 r.p.m. to be as follows:

| Degree of Neutralization, Percent | Viscosity, Centipoises |
|---|---|
| 0 | 112 |
| 25 | 3,320 |
| 50 | 4,540 |
| 75 | 3,110 |
| 100 | 1,397 |

It thus appears that the maximum viscosity occurs in the range of 25 to 75% neutralization and that as complete neutralization is approached the viscosity is greatly reduced.

Example IV

A series of highly water-sensitive acrylic acid copolymers are made with varying amounts of polyallyl or polyalkenyl polyethers of several saccharides. The polymerizations are conducted at 50° C. in 880 parts of benzene or hexane using 0.5 part of caprylyl peroxide as catalyst. The reactions in every case are essentially complete in 1 to 10 hours. The polyalkenyl polyethers and amounts utilized are as follows:

| Polymer | Polyallyl Polyether | Amount |
|---|---|---|
| C | Polyallyl polyether of sucrose (5.0 allyl groups/molecule). | 0.4 |
| D | ----do---- | 0.7 |
| E | ----do---- | 1.0 |
| F | ----do---- | 1.5 |
| G | Diallyl ethylene glycol ether. | 1.0 |
| H | Polyallyl polyether of sorbitol (4.7 allyl groups/molecule). | 1.0 |
| I | ----do---- | 2.0 |
| J | Polyallyl polyether of pentaerythritol (2.78 allyl groups/molecule). | 2.0 |
| K | Polyallyl polyether of raffinose (6.7 allyl groups/molecule). | 2.0 |
| L | Polyallyl polyether of inositol (4.1 ally groups/molecule). | 2.0 |
| M | Polyallyl polyether of sorbitol (3.7 allyl groups/molecule). | 2.0 |
| N | Polymethallyl polyether of sucrose (5.0 methallyl groups/molecule). | 1.0 |
| O | Polycrotyl polyether of sucrose (3.0 crotyl groups/molecule). | 2.5 |

The polymers are obtained, after filtration and solvent removal, in every case as extremely fine friable powders having an average particle size finer than 325 mesh. The polymers are dry mixed with sufficient pulverulent sodium bicarbonate to form the 75% sodium salt and the resulting mixtures soaked in water. Conversion to smooth mucilages containing 0.5, 1.0, or 1.5% by weight of the dry polymer salt occurs upon simple mixing in a mortar. The mucilages in every case are smooth and non-grainy in nature and have a uniformly higher viscosity than similar mucilages made from similar polymers prepared in water or dioxane and dried and reground. The viscosity of these mucilages are several times as high as tragacanth or sodium alginate, the 1.5% mucilages being well above 1000 poises in viscosity. The mucilages evidence good cohesion and high yield point adapting them for pharmaceutical mucilaginous applications such as tooth pastes, surgical jellies, contraceptive jellies, burn remedies, and other applications where high demulcent action is desired. In addition, these polymers contain such low soluble content and so tenaciously retain water against osmotic pull that they are admirably adapted for use as bulk laxatives, ion exchange resins for use in vitro (in the gastro-intestinal tract) and as carriers, bulking agents, etc.

*Example V*

In an effort to determine the reason for differences in swelling indices and mucilage viscosity of those polymers prepared in water (or other swelling solvent) as against hydrocarbon-polymerized polymer, a mixture of 98.5% by weight anhydrous acrylic acid and 1.5% of polyallyl sucrose (6.0 allyl groups/molecule) is polymerized in water at 50° C. using a 7% monomer concentration and 0.3% potassium persulfate catalyst. The product obtained is a voluminous rubbery gel. The gel is divided into three portions and treated in three ways:

(1) The water-swollen gel is neutralized in situ to form the 75% sodium salt without drying.

(2) The rubbery, gel-like acid-form polymer is dried and then reground. The reground polymer is screened with the separation of three fractions, less than 325 mesh, between 325 to 140 mesh and larger than 140 mesh. The three powders are then resuspended in aqueous alkali to form the 75% sodium salt in mucilage form.

(3) A portion of the rubbery neutralized gel from (1) above is dried, reground and then resuspended to form a mucilage.

The mucilages prepared in (1) to (3), above, containing 1% and 2% by weight of polymer salt are tested for viscosity, utilizing the Interchemical rotational viscometer operated at 200 r.p.m. A mucilage made, in accordance with this invention, from a polymer prepared by polymerization in benzene is also tested for comparative purposes. The results are as follows:

| Polymer Fraction | Mesh Size | Viscosity, cp. 2% | Viscosity, cp. 1% | Mucilage Appearance |
| --- | --- | --- | --- | --- |
| (1) | Water-swollen gel | 2,930 | 1,510 | Smooth, non-grainy. |
| (2) Dried as acid form polymer | <325 | 1,670 | 548 | Grainy. |
|  | 140-325 | 2,790 | 600 | Do. |
|  | >140 | 2,580 | 910 | Very grainy. |
| (3) Dried as salt | <325 | 1,190 | 522 | Satisfactory. |
|  | 140-325 | ¹TLTT | TLTT | Grainy. |
|  | >140 | TLTT | TLTT | Very grainy. |
| (4) Prepared in benzene-mucilage made by dry mixing. | <325 |  | 1,750 | Very smooth, non-grainy. |

¹ Too low to test.

It is to be noted that in order to prepare mucilages which combine the properties of smoothness and high viscosity, it is necessary in the case of polymers prepared in water (or other medium having swelling action on the insoluble polymer) to avoid any steps involving drying the polymer or its salt. It should also be noted that extremely fine grinding reduces the graininess but adversely affects the viscosity, the finer the particle size the lower the viscosity. When it is desired to prepare smooth, non-grainy mucilages of high viscosity from a dry polymer, it is readily apparent that the polymer must be prepared in a hydrocarbon medium having no appreciable swelling effect on the polymer.

*Example VI*

Copolymers of acrylic and allyl sucrose type monomers are produced by polymerization in benzene, which copolymers contain 10% or less water-solubles (frequently less than 1%) and are more uniform and of more predictable molecular weight, viscosity, and other properties than are obtainable in any other common solvent. The reaction mixture employed is as follows:

| Material | Parts/Wt. |
| --- | --- |
| Acrylic acid | Variable } to total 100. |
| Polyallyl polyether of sucrose (6.0 groups/molecule) | 0.5 to 2.0% |
| Azoisobutyronitrile | 0.5 to 1.0. |
| Benzene | 880. |

The polymerization is carried out under autogenous pressure at 50° C. The product in each case is a fine, friable powder of less than 325 mesh. The acid-form polymers are first freed of solvent, then swollen in water, converted to the 75% sodium salt and finally ground to form a smooth mucilage. The viscosity of the mucilages are as follows:

[0.5% polyallyl sucrose.]

| Conc. | Viscosity, poises |
| --- | --- |
| 1.5% | 808 |
| 1.0% | 640 |
| 0.5% | 420 |

[1.0% polyallyl sucrose.]

| Conc. | Viscosity, poises |
| --- | --- |
| 1.5% | >1,000 |
| 1.0% | >1,000 |
| 0.5% | 720 |

[1.25% polyallyl sucrose.]

| Conc. | Viscosity, poises |
| --- | --- |
| 1.5% | >1,000 |
| 1.0% | >1,000 |
| 0.5% | 920 |

[1.75% polyallyl sucrose.]

| Conc. | Viscosity, poises |
| --- | --- |
| 1.5% | >1,000 |
| 1.0% | >1,000 |
| 0.5% | 560 |

[2.0% polyallyl sucrose.]

| Conc. | Viscosity, poises |
| --- | --- |
| 1.5% | >1,000 |
| 1.0% | >1,000 |
| 0.5% | 300 |

These polymers exhibit mucilage viscosities too great to measure on the Brookfield viscometer and, in fact for the amount of polymer utilized, more viscous than any other known gum-like material. The acid-form polymers have a swelling index in distilled water varying from 53 to 224 while their 75% partial sodium salts have swelling indices of up to 3 or 4 times as great. Results similar to these are obtained when a 1/1 molar mixture of acrylic acid and maleic anhydride is polymerized with 0.5 to 2% of polyallyl sucrose.

*Example VII*

A series of tripolymers of acrylic acid, styrene and either allyl sucrose or divinylbenzene are prepared by polymerization in pure hexane at 50° C. The polymerization in each case progresses smoothly to a yield of 80%, the polymer being obtained as a uniform, extremely fine and voluminous, friable precipitate. The polymers are dry mixed with 0.75 equivalent of sodium hydroxide pellets and the mixture ball milled until it passed a 100 mesh screen. Mucilages are made therefrom by simple mixing with water, followed by agitation until the gelatinous state is reached. The swelling indices in distilled water for the sodium salts of several allyl sucrose tripolymers are as follows:

| Monomeric Composition, Parts/wt. | S.I. |
|---|---|
| 43 Acrylic acid/56 styrene/1 polyallyl sucrose | 175 |
| 42.5 Acrylic acid/55.5 styrene/2 polyallyl sucrose | 130 |
| 42/ Acrylic acid/54 styrene/4 polyallyl sucrose | 75 |

A mucilage prepared from 75% sodium salt of a tripolymer of 41.5 acrylic acid/54.5 styrene/3.8 allyl sucrose/at 2% concentration has a viscosity as determined on the Brookfield viscometer using spindle #4 at 6 r.p.m. of 80 poises. The 75% sodium salt of similar tripolymers made with divinyl benzene as the cross-linking agent exhibit mucilage viscosity as follows:

| Monomeric Composition, Parts/weight | Viscosity, Poises |
|---|---|
| 55 acrylic acid/43 styrene/1 divinylbenzene | 180 |
| 56 acrylic acid/43 styrene/2 divinylbenzene | 20 |

*Example VIII*

Methacrylamide likewise forms highly hydrophilic tripolymers with acrylic acid and allyl sucrose. For example, the following materials are heated at 50° C.

| Material | Parts/weight | |
|---|---|---|
| | A | B |
| Acrylic acid | 98.6 | 71.0 |
| N-methyl/acrylamide | 0.0 | 27.6 |
| Polyallyl sucrose | 1.4 | 1.4 |
| Caprylyl peroxide | 0.5 | 0.5 |
| Benzene | 880.0 | 880.0 |

The polymers are ball milled with caustic pellets and dispersed in water to form mucilages. The swelling indices in distilled water of the 75% sodium salt of polymers A and B are the same order. There is some evidence that methacrylamide tripolymers are more resistant to deswelling than are the cross-linked acrylic acid copolymers. The above polymers are possessed of the ability to emulsify the oily ingredients (5 to 30 parts mineral oil) of an auto polish or cleaner. As little as 0.3 to 0.5% of the 75% sodium salt is sufficient to give a smooth, permanent emulsion having the viscosity characteristics of a similar composition containing as much as 75% gum tragacanth.

*Example IX*

A sulfur containing polyunsaturated monomer can be employed as a cross-linking agent to form hydrophilic polymers with other polymerizable monomers. The following materials can be reacted at 50° C. to produce very useful end products:

| Material | Parts/weight | |
|---|---|---|
| | A | B |
| Maleic anhydride | 62.8 | 62.8 |
| Methyl vinyl ether | 37.2 | 37.2 |
| Hexallyl trimethylene trisulfone | 2.0 to 4.0 | |
| Benzoyl peroxide | 2.0 | 2.0 |
| Benzene | 880 | 880 |
| Percent Yield | 100 | 100 |

These polymers were obtained as fine white powders. Aqueous mucilages of these polymers have physical characteristics very much like those of other cross-linked carboxylic polymers. The Brookfield viscosity of these polymers in aqueous media is shown below:

| Polymer Conc. | A, poises | B, poises |
|---|---|---|
| 1.5% | 240 | 320 |
| 1.0% | 160 | 280 |
| 0.5% | 80 | 200 |

*Example X*

Water-insoluble polymers which are extremely water-sensitive or high-swelling in character are prepared from mixtures of acrylic acid, a cross-linking agent, and other monomers which introduce hydrophilic groups other than carboxyls, or whose polymers after slight chemical treatment will contain such other groups. For example, when acrylic acid is cross-linked with divinyl ether, a gel-like, hydrophilic polymer is formed which, however, gradually goes into solution upon standing in water. The resultant soluble polymer gives definite evidence upon X-ray examination of alcoholic hydroxyls in addition to carboxylic hydroxyls and their presence is believed due to hydrolysis or breaking of divinyl ether cross-links. Such a polymer may be insolubilized by heating to about 100° C. The presence of alcoholic hydroxyls is strongly suspected in insoluble tripolymers of maleic anhydride, divinyl ether and polyallyl sucrose but these polymers remain highly insoluble due to the stability of the polyallyl sucrose cross-links. These hydrolyzed, insoluble tripolymers containing 0.5 to 1.0% polyallyl sucrose form especially desirable and very viscous mucilages. A series of these tripolymers are made using the following reaction mixture:

| Material | Parts/weight | | | | |
|---|---|---|---|---|---|
| | I | II | III | IV | V |
| Acrylic Acid | 67.3 | 80.5 | 67.3 | | |
| Maleic Anhydride | | | | 73.3 | 74.0 |
| Divinylether | 32.7 | 19.5 | 32.7 | 25.7 | 26.0 |
| Polyallyl sucrose | 1.0 | 1.0 | 0.5 | 1.0 | |
| Benzoyl Peroxide | 1.0 | 1.0 | 1.0 | 1.0 | 1.0 |
| Benzene | 880.0 | 880.0 | 880.0 | 880.0 | 880.0 |

The reactions are carried out at 50° C. under autogenous pressure. When placed in water overnight polymer No. V goes completely into solution. Polymers Nos. I to IV are hydrolyzed in water but remain highly insoluble. The presence of small amounts of sodium or ammonium hydroxide or a strong acid such as HCl speeds the hydrolysis. Infrared analysis of the polymers confirms the presence of non-carboxylic hydroxyls.

The viscosity of mucilages prepared from the 75% sodium salts of polmers I to IV, above, are as follows:

| Polymer No. | I, poises | II, poises | III, poises | IV, poises |
|---|---|---|---|---|
| Mucilage Conc.: | | | | |
| 1.5% | >1,000 | >1,000 | >1,000 | 964 |
| 1.0% | >1,000 | >1,000 | >1,000 | 588 |
| 0.5% | 60 | 900 | 240 | 216 |

A tooth paste formulation made from polymer No. IV according to the procedure described in Example 3 is possessed of an initial cohesion value of 6 ounces (same as commercial tragacanth-thickened tooth pastes) and possesses such excellent suspension stability that no separation is observed after centrifuging for 30 minutes at 2400 r.p.m.

Example XI

Still other tripolymers of acrylic acid and polyallyl sucrose are made using vinyl N-butyl ether, vinyl ethyl ether and N-methyl acrylamide as the third monomers. The following proportions of materials are used:

| Material | I | II | III | IV | V | VI | VII | VIII | IX | X | XI |
|---|---|---|---|---|---|---|---|---|---|---|---|
| Acrylic Acid | 90 | 70 | 50 | 30 | 10 | 90 | 80 | 60 | 90 | 75 | 50 |
| N-methyl acrylamide | 10 | 30 | 50 | 70 | 90 | | | | | | |
| Vinyl n-butyl ether | | | | | | 10 | 20 | 40 | | | |
| Vinyl Ethyl ether | | | | | | | | | 10 | 25 | 50 |
| Allyl sucrose (6.08 allyl groups/molecule) | 1.0 | 1.0 | 1.0 | 1.0 | 1.0 | 1.0 | 1.0 | 1.0 | 1.0 | 1.0 | 1.0 |
| Benzoyl Peroxide | 1.0 | 1.0 | 1.0 | 1.0 | 1.0 | 1.0 | 1.0 | 1.0 | 1.0 | 1.0 | 1.0 |
| Benzene | 880 | 880 | 880 | 880 | 880 | 880 | 880 | 880 | 880 | 880 | 880 |
| Conversion, percent | 98 | 100 | 100 | 100 | 100 | 90 | 80 | 64 | | 76 | 98 |

The reactions are carried out in each case at 50° C. with batch charging in a closed vessel. The polymers are isolated, freed of solvent, allowed to swell in a sodium hydroxide solution to form the 75% sodium salt, and finally ground in a mortar to form smooth, non-grainy mucilages. The viscosity characteristics of these mucilages at varying concentrations of polymer salt are as follows:

| Conc., percent | Viscosity, poises | | | | | | | | | | |
|---|---|---|---|---|---|---|---|---|---|---|---|
| | I | II | III | IV | V | VI | VII | VIII | IX | X | XI |
| 1.5 | >1,000 | >1,000 | >1,000 | 580 | 640 | 900 | 528 | 80 | 360 | 500 | 900 |
| 1.0 | >1,000 | >1,000 | >1,000 | 440 | 500 | 840 | 480 | 44 | 300 | 444 | 840 |
| 0.5 | 820 | 820 | 780 | 400 | 340 | 760 | 400 | 24 | 200 | 328 | 760 |

The surprising feature of the tripolymers of Example XI, however, is the strong hydrophilic effect of the non-carboxylic hydroxyls (resulting from the hydrolysis of the ether groups) and amide groups. Even though relatively large proportions of the acrylic acid have been replaced, the tripolymers evidence remarkable water-sensitivity and high mucilage viscosity. The hydrophilic power of the amide group, however, depends to some extent on the structure of the amide monomer. Tripolymers containing methacrylamide, which has exactly the same molecular weight as N-methyl acrylamide, produces lower viscosity polymers than the latter. To illustrate, a series of acrylic and methacrylamide tripolymers cross-linked with 1% by weight of allyl sucrose are converted to mucilages of the 75% sodium salt and found to have the following properties:

| Percent Methacrylamide in Polymer | 20% | 40% | 60% | 80% |
|---|---|---|---|---|
| Mucilage Conc., Percent: | | | | |
| 1.5 | >1,000 | 380 | 60 | TLTT [1] |
| 1.0 | >1,000 | 320 | 24 | TLTT [1] |
| 0.5 | >1,000 | 160 | TLTT [1] | TLTT [1] |

[1] Too low to test.

Example XII

The vinyl ethers produce similar insoluble, hydrolyzed polymers with maleic anhydride as the carboxylic monomer and allyl sucrose (6.08 groups/molecule) as the cross-linking agent. The polymerizations, in each case, are carried out at 50° C. in 880 parts benzene/100 of monomers using 2 parts/wt. benzoyl peroxide catalyst. The monomeric mixtures so polymerized are as follows:

| Monomers | Parts/wt. | | |
|---|---|---|---|
| | I | II | III |
| Maleic anhydride | 50 | 60 | 62.8 |
| Vinyl n-butyl ether | 56 | | |
| Vinyl ethyl ether | | 40 | |
| Vinyl methyl ether | | | 37.2 |
| Allyl sucrose (6.08 groups/molecule) | Varied 0.5, 1.0, 1.5 and 2.0% | | |

The polymers form viscous mucilages in aqueous alkali, the type III triploymer which was made with 1.0 part of allyl sucrose having the following viscosity characteristics:

| Polymer Conc., Percent | Viscosity, poises |
|---|---|
| 1.5 | 360 |
| 1.0 | 332 |
| 0.5 | 260 |
| 0.25 | 96 |

When chemically modified by half-ester formation or by partial amide salt formation, the vinyl ether/maleic anhydride tripolymers of Example 3 acquire a threefold thickening, suspending (solid ingredients) and emulsifying (oily or liquid materials) characteristic. Polishing and cleaning material such as auto and furniture cleaners (emulsion or cream types) contain scouring agents such as fine pumice or diatomaceous earth and polishing agents such as oily hydrocarbons, vegetable oils, wax solutions and the like. Few commercial dispersing and suspending agents have the ability to form truly stable dispersions of these highly dissimilar ingredients having the desired viscosity characteristics. It is conventional in these compositions to use a combination of one or more surface-active agents with thickeners such as gum tragacanth because few surface-active agents have thickening action and few thickeners have both suspending and emulsifying action. When, however, a portion of the benzene reaction slurry of polymer III of Example XII is mixed with two equivalents of methanol (based on carboxyl content) and heated for 24 hours at 50° C. an insoluble, finely-divided polymeric half-ester results which requires only to be washed with benzene and then freed of solvent before use. The resultant polymeric half-ester is first swollen in aqueous alkali and then agitated to form an ordinary aqueous mucilage of the 75% sodium salt. The viscosity of the resulting mucilage is of the order of that of the unmodified polymer reported above. When, however, a small quantity (i.e. 5 to 20% by weight) of light mineral oil is added to the aqueous mucilage a manifold thickening occurs with the formation of a stable oil-in-mucilage dispersion having the consistency of a cold cream (over 1000 poises). Only 0.38% by weight of the polymeric half-ester salt is required to form a smooth, creamy auto polish-cleaner composition containing diatomaceous earth as a scouring agent and a mixture of kerosene and mineral oil as the polishing agent. The resulting oil-in-water, diatomaceous earth suspension is so stable as to show no separation of oil or diatomaceous earth when centrifuged for three minutes at 2000 r.p.m. In contrast, as much as 0.75% by weight or more of gum tragacanth together with a substantial proportion of an auxiliary dispersing agent is required to form a similarly satisfactory cleaner-polish composition.

*Example XIII*

A copolymer is made from a monomeric mixture consisting of 98.5 parts acrylic acid and 1.5 parts allyl sucrose by polymerization at 50° C. in benzene. A mucilage made from the 75% sodium or potassium salts of this copolymer at 2% concentration is deswelled by electrolyte in the same manner as is gum tragacanth but in all cases the acrylic acid copolymer gel maintains a higher absolute swell than gum tragacanth. For example, in 0.005 N and 0.01 N hydrochloric acid the swelling indices of the acrylic acid allyl sucrose copolymer salt are considerably higher than that of gum tragacanth. Similarly the swelling indices of the copolymer in 0.001, 0.01 and 0.1 molar solutions of sodium chloride are uniformly higher than that of gum tragacanth. This ability to maintain higher absolute swell in the presence of electrolytes is especially important in applications where the mucilage-like composition is taken orally in various medicinal applications such as bulk laxatives, ion-exchange resins for treatment of edema, carrier agents, thickening agents, emulsifiers, and others.

The copolymer salt of the above example has another important property having bearing on the usefulness of the mucilaginous compositions of this invention for oral administration, namely its water retention against osmotic pull. The polymer salt is made into a mucilage-like composition using artificial intestinal juice (HCl and pepsin), as the aqueous medium and the water loss measured across the semi-permeable membrane of an osmometer, a hypertonic solution of 30% "Carbowax 4000–W" being used in the other cell. The water loss in cc. is compared below to a similar composition made from methyl cellulose (4000 poises):

| Time (Hours) | Copolymer Water Loss | Methocel Water Loss |
| --- | --- | --- |
| 30 | 19.3 | 19.5 |
| 60 | 22.8 | 24.4 |
| 90 | 24.5 | 27.0 |

*Example XIV*

Still other cross linking agents may be utilized in preparing acrylic acid polymers useful in this invention. For example, diethylene glycol dimethacrylate used to the extent of 1 or 2% produces insoluble gel-like copolymers with acrylic acid which are highly swollen in the form of their salts. Similarly, 1 to 2% of allyl beta-allyloxy propionate produces insoluble but highly hydrophilic acrylic acid copolymer salt gels useful in this invention.

Similarly, a mixture of equal parts by weight of acrylic acid and maleic anhydride together with 4 parts of allyl sucrose per 100 parts of the mixture, polymerize in hexane at 50° C. to produce an interpolymer which when converted to the 75% sodium salt is highly hydrophilic. A mucilage-like composition made by dry mixing the fine polymer precipitate with 0.75 equivalent of pulverulent sodium hydroxide and then malaxating with water is smooth and non-grainy in character and is much more viscous than a similar composition made with a similar amount of gum tragacanth or with an equivalent amount of sodium salt which has been once swollen and subsequently reduced to dryness and reground.

In addition to the polymers described above, the following tabulated cross-linked polymers can be used to prepare smooth viscous mucilages.

| | Polymer Ingredient | Parts by Weight | Viscosity 1.5% by weight of 75% Na salt in water |
| --- | --- | --- | --- |
| XV | Chloromaleic anhydride | 69.6 | 4 |
| | Methylvinyl ether | 30.4 | |
| | Allyl sucrose | 6 | |
| XVI | Citraconic anhydride | 66 | 16 |
| | Methylvinyl ether | 34 | |
| | Allyl sucrose | 6 | |
| XVII | Maleic anhydride | 62.8 | 108 |
| | Methyl vinyl ether | 37.2 | |
| | Tetraallyl pentaerythritol | 1.5 | |
| XVIII | Maleic anhydride | 62.8 | 240 |
| | Methyl vinyl ether | 37.2 | |
| | Allyl starch | 1.5 | |
| XIX | Maleic anhydride | 62.8 | 920 |
| | Methyl vinyl ether | 37.2 | |
| | Methylene-bis-acrylamide | 2 | |
| XX | Maleic anhydride | 62.8 | 716 |
| | Methyl vinyl ether | 37.2 | |
| | Methylene-bis-methacrylamide | 2 | |
| XXI | Maleic anhydride | 62.8 | 320 |
| | Methyl vinyl ether | 37.2 | |
| | Hexaallyl trimethylene trisulfone | 4 | |
| XXII | Maleic anhydride | 62.8 | 280 |
| | Methyl vinyl ether | 37.2 | |
| | 1,3,5, triacrylyl triazine | 6 | |
| XXIII | Maleic anhydride | 62.8 | 1,232 |
| | Methyl vinyl ether | 37.2 | |
| | 1,3,5 trimethacrylyl triazine | 6 | |
| XXIV | Acrylic acid | 98 | 1,680 |
| | Triallylcyanurate | 2 | |

Insoluble, highly hydrophilic polymers, made by substituting methacrylic acid, ethacrylic acid, alpha-chloro acrylic acid, and other acrylic acids in whole or part for the acrylic acid and/or maleic anhydride utilized in the foregoing examples, are utilized in the production of smooth, non-grainy mucilaginous compositions having excellent viscosity characteristics. As a class, these carboxylic acid type polymer gels are equal or superior to the natural gum bodying agents.

The mucilaginous compositions of the insoluble but highly hydrophilic carboxylic polymers disclosed above have manifold applications in addition to those demonstrated above. They may be utilized in the preparation of textile printing pastes containing either oil insoluble coloring pigments (ground-in-oil) or solutions of solvent- or oil-soluble dyestuffs. Interpolymers of acrylic acid and/or maleic anhydride and a polyallyl polyether of sucrose, or rather the sodium or ammonium salts thereof, for example, form textile printing pastes of the oil-in-water or water-in-oil types with insoluble coloring pigments and dye-stuffs. The mucilaginous compositions also can be converted to textile printing pastes or printing inks containing both soluble and insoluble coloring materials and dyesuffs. The partial ammonium salts of the carboxylic acid polymers form especially useful printing pastes since the cross-linked polymeric thickening agent is insolubilized by application of heat through formation of di-amide or imide cross-links. Cosmetics such as hand lotions, cold creams, ointments, powder bases, jellied-type and cream-type shampoos, and others are advantageously made with the aqueous mucilages of this invention as the base. Polishing and cleaning compositions of a wide variety may be made from the mucilages by addition of scouring agents, oils, waxes, solvents and the like. Natural and synthetic rubber and resin coating compositions of any desired viscosity, including thick creamy hydrogels, are readily prepared by adding a latex or dispersion of the rubber or resin, such as natural rubber, butadiene/styrene copolymers, butadiene acrylonitrile copolymers or polyvinyl chloride, to an aqueous mucilage prepared according to any of the procedures outlined above. Other applications will readily occur to those skilled in the art.

While we have disclosed certain preferred manners of performing our invention, we do not thereby desire or intend to limit ourselves solely thereto, for the precise proportions of the materials utilized may be varied and equivalent chemical materials may be employed, if desired, without departing from the spirit and scope of the invention as defined in the appended claims.

We claim:

1. The method of preparing a smooth, non-grainy mucilaginous composition comprising mixing (A) a finely divided water-insoluble but water-swellable cross-linked carboxylic interpolymer having an average particle size smaller than 100 mesh, said cross-linked interpolymer being derived by polymerizing a monomeric mixture in the presence of a free radical catalyst in a hydrocarbon solvent having solvent action on the monomeric mixture but substantially no solvent action and no swelling action on the resulting interpolymer, said monomeric mixture comprising as essential ingredients (1) at least 25% by weight of an alpha,beta-monoolefinically unsaturated, aliphatic carboxylic acid having from 3 to 4 carbon atoms, (2) up to 75% by weight of a different monoolefinic monomer copolymerizable with said acids, and (3) not less than 0.1% nor more than 6.0% by weight based on the total polymerizable material of a cross-linking agent selected from the class consisting of polyallyl ethers of parent polyhydric alcohols having at least 4 carbon atoms and at least three alcoholic OH groups, hexaallyl trimethylene trisulfone, allyl beta-allyloxy propionate, methylene bis-acrylamide, methylene bis-methacrylamide, 1,3,5-triacrylyl triazine, and triallyl cyanurate, (B) water and (C) a sufficient amount of a water-soluble monovalent base to neutralize 25 to 85% of the carboxyl groups in said carboxylic interpolymer, the resulting aqueous mixture containing 0.1 to 10% of the interpolymer salt, and dispersing the neutralized interpolymer in the aqueous mixture until a smooth, non-grainy mucilaginous composition is obtained.

2. The method of preparing a smooth, non-grainy, mucilaginous composition comprising mixing (A) a finely divided, water-insoluble, but water-swellable cross-linked carboxylic interpolymer having an average particle size smaller than 100 mesh, said cross-linked interpolymer being derived by copolymerizing a monomeric mixture in the presence of a free radical catalyst in a hydrocarbon solvent having solvent action on said monomeric mixture but substantially no solvent action and no swelling action on the resulting interpolymer, said monomeric mixture comprising as essential ingredients (1) at least 25% by weight of an alpha,beta-monoolefinically unsaturated aliphatic carboxylic acid having from 3 to 4 carbon atoms, (2) up to 75% by weight of a different monoolefinic monomer copolymerizable with said acids and (3) not less than 0.1% by weight nor more than 4.0% by weight based on the total polymerizable material of a polyallyl ether of a parent polyhydric alcohol having at least 4 carbon atoms and at least three OH groups, the hydroxyl groups of said polyol which are modified being etherified with allyl groups, said polyol having at least two allyl groups per polyol molecule with (B) water and (C) sufficient water-soluble monovalent base to neutralize 25 to 85% of the carboxyl groups in said carboxylic interpolymer, the resulting aqueous mixture containing 0.1 to 10% by weight of the interpolymer salt, and dispersing the neutralized interpolymer in the aqueous mixture until a smooth, non-grainy mucilaginous composition is obtained.

3. The method of preparing a smooth, non-grainy mucilaginous composition comprising mixing (A) a finely divided, water-insoluble but water-swellable cross-linked carboxylic interpolymer having an average particle size smaller than 100 mesh, said cross-linked interpolymer being derived by polymerizing a monomeric mixture in the presence of a free radical catalyst in a hydrocarbon solvent having solvent action on said monomeric mixture but substantially no solvent action and no swelling action on the resulting interpolymer, said monomeric mixture comprising as essential ingredients (1) at least 40% by weight of an anhydrous acrylic acid of the structure

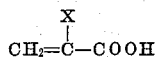

wherein X is selected from the class consisting of hydrogen and methyl, (2) up to 60% by weight of a different monoolefinic monomer copolymerizable with said acid and (3) not less than 0.2 nor more than 2.5% by weight based on the total polymerizable material of a cross-linking agent selected from the class consisting of polyallyl ethers of parent polyhydric alcohols having at least 4 carbon atoms and at least three alcoholic OH groups, hexaallyl trimethylene trisulfone, allyl beta-allyloxy propionate, methylene bis-acrylamide, methylene bis-methacrylamide, 1,3,5-triacrylyl triazine, and triallyl cyanurate with (B) water and (C) a sufficient amount of a water-soluble monovalent base to neutralize 25 to 85% of the carboxyl groups in said carboxylic interpolymer, the resulting aqueous mixture containing 0.1 to 10% of the interpolymer salt, and dispersing the neutralized interpolymer in the aqueous mixture until a smooth, non-grainy mucilaginous composition is obtained.

4. The method of preparing a smooth, non-grainy mucilaginous composition comprising mixing (A) a finely divided, water-insoluble but water-swellable cross-linked carboxylic interpolymer having an average particle size smaller than 100 mesh, said cross-linked interpolymer being derived by polymerizing a monomeric mixture in the presence of a free radical catalyst at a temperature of 0 to 100° C. in benzene, said monomeric mixture comprising as essential ingredients (1) at least 40% by weight of anhydrous acrylic acid and up to 60% by weight of a different monoolefinic monomer copolymerizable with said acid and (2) not less than 0.2% nor more than 2.5% by weight based on the total polymerizable material of a polyallyl ether of an oligosaccharide containing at least 2 allyl groups per molecule, with (B) sufficient pulverulent solid, water-soluble base to neutralize 25 to 85% of the carboxyl groups in said carboxylic interpolymer, adding sufficient of the resulting dry interpolymer-monovalent base mixture to water to constitute .2 to 5% by weight of the total, and agitating the resulting granular dispersion until a smooth, non-grainy mucilaginous composition is obtained.

5. The method of claim 4 in which the monomeric mixture consists of acrylic acid, and up to 50% based on the weight of the acrylic acid of a hydrophobic monoolefinic monomer which copolymerizes with acrylic acid and not less than 0.2% nor more than 2.5% by weight of a polyallyl ether of sucrose.

6. The method of claim 4 in which the finely divided carboxylic interpolymer is a copolymer of 97.5 to 99.8% by weight of acrylic acid and 0.2 to 2.5% by weight of a polyallyl polyether of sucrose containing at least two allyl ether groups per molecule.

7. A method of preparing a smooth, non-grainy mucilaginous composition comprising mixing (A) a finely divided, water-insoluble but water-swellable, cross-linked carboxylic interpolymer having an average particle size smaller than 100 mesh, said cross-linked interpolymer being derived by polymerizing a monomeric mixture in benzene at a temperature of 0 to 100° C. in the presence of a free radical catalyst, said monomeric mixture comprising anhydrous acrylic acid and not less than 0.2 nor more than 2.5% by weight, based on the total polymerizable material of a polyallyl ether of sucrose containing at least 2 allyl groups per molecule and up to equimolar parts based on said acrylic acid of a different monolefinically unsaturated monomer copolymerizable with said acid with (B) sufficient pulverulent, solid, alkali metal hydroxide to neutralize 25 to 85% of the carboxyl groups on said interpolymer, adding sufficient of the resulting interpolymer-alkali metal hydroxide mixture to water to constitute 0.2 to 5% by weight of the total and agitating the aqueous mixture until a smooth, non-grainy composition is obtained.

8. A method of preparing a smooth, non-grainy mucilaginous composition comprising mixing (A) a finely divided, water-insoluble but water-swellable, cross-linked carboxylic interpolymer having an average particle size small than 100 mesh, said cross-linked interpolymer being derived by polymerizing in benzene at a temperature of 0 to 100° C. in the presence of a free radical catalyst, a monomeric mixture consisting of 40 to 95% by weight of acrylic acid, 4.9 to 59.9% by weight of styrene and 0.1 to 4.0% by weight, based on the total polymerizable material of a polyallyl ether of sucrose containing at least 2 allyl groups per molecule with (B) sufficient pulverulent, solid, alkali metal hydroxide to neutralize 25 to 85% of the carboxyl groups on said interpolymer, adding sufficient of the resulting interpolymer-alkali metal hydroxide mixture to water to constitute 0.2 to 5% by weight of the total and agitating the aqueous mixture until a smooth, non-grainy composition is obtained.

9. A method of preparing a smooth, non-grainy mucilaginous composition comprising mixing (A) a finely divided, water-insoluble but water-swellable, cross-linked carboxylic interpolymer having an average particle size smaller than 100 mesh, said cross-linked interpolymer being derived by polymerizing in benzene at a temperature of 0 to 100° C. in the presence of a free radical catalyst, a monomeric mixture consisting of 40 to 95% by weight of acrylic acid, 4.9 to 59.9% by weight of N-methyl acrylamide and 0.1 to 4.0% by weight based on the total polymerizable material of a polyallyl ether of sucrose containing at least 2 allyl groups per molecule with (B) sufficient pulverulent, solid, alkali metal hydroxide to neutralize 25 to 85% of the carboxyl groups on said interpolymer, adding sufficient of the resulting interpolymer-alkali metal hydroxide mixture to water to constitute 0.2 to 5% by weight of the total and agitating the aqueous mixture until a smooth, non-grainy composition is obtained.

10. A method of preparing a smooth, non-grainy mucilaginous composition comprising mixing (A) a finely divided, water-insoluble but water-swellable, cross-linked carboxylic interpolymer having an average particle size smaller than 100 mesh, said cross-linked interpolymer being derived by polymerizing in benzene at a temperature of 0 to 100° C. in the presence of a free radical catalyst, a monomeric mixture consisting of 40 to 95% by weight of acrylic acid, 4.9 to 59.9% by weight of methacrylamide and 0.1 to 4.0% by weight based on the total polymerizable material of a polyallyl ether of sucrose containing at least 2 allyl groups per molecule with (B) sufficient pulverulent, solid, alkali metal hydroxide to neutralize 25 to 85% of the carboxyl groups on said interpolymer, adding sufficient of the resulting interpolymer-alkali metal hydroxide mixture to water to constitute 0.2 to 5% by weight of the total and agitating the aqueous mixture until a smooth, non-grainy composition is obtained.

11. A method of preparing a smooth, non-grainy mucilaginous composition comprising mixing (A) a finely divided, water-insoluble but water-swellable, cross-linked carboxylic interpolymer having an average particle size smaller than 100 mesh, said cross-linked interpolymer being derived by polymerizing in benzene at a temperature of 0 to 100° C. in the presence of a free radical catalyst, a monomeric mixture consisting of 40 to 95% by weight of acrylic acid, 4.9 to equimolar quantities based on the acrylic acid of methyl vinyl ether and 0.1 to 4.0% by weight based on the total polymerizable material of a polyallyl ether of sucrose containing at least 2 allyl groups per molecule with (B) sufficient pulverulent, solid, alkali metal hydroxide to neutralize 25 to 85% of the carboxyl groups on said interpolymer, adding sufficient of the resulting interpolymer-alkali metal hydroxide mixture to water to constitute 0.2 to 5% by weight of the total and agitating the aqueous mixture until a smooth, non-grainy composition is obtained.

12. A substantially anhydrous granular mucilage-forming composition comprising (A) fine granules of a cross-linked water-insoluble, water-sensitive acid form of a polymer having an average particle size smaller than about 100 mesh and resulting from the polymerization in an organic solvent having solvent action on the monomers but substantially no swelling action and substantially no solvent action on the polymers of a monoolefinic monomeric mixture comprising (1) at least 25% by weight of an alpha,beta-monoolefinically unsaturated, aliphatic carboxylic acid having from 3 to 4 carbon atoms, (2) up to 75% of a different monoolefinic monomer copolymerizable with said acid and (3) not less than 0.10% nor more than 6.0% by weight based on the total polymerizable material of a cross-linking agent selected from the class consisting of polyallyl ethers of parent polyhydric alcohols having at least 4 carbon atoms and at least three alcoholic OH groups, hexaallyl trimethylene trisulfone, allyl beta-allyloxy propionate, methylene bis-acrylamide, methylene bis-methacrylamide, 1,3,5-triacrylyl triazine, and triallyl cyanurate and (B) a sufficient amount of a granular water-soluble, solid monovalent base to neutralize said acid form polymer to the extent of 25 to 85%.

13. A substantially anhydrous mucilage-forming powdery composition comprising (A) fine particles of a water-insoluble, water-sensitive acid-form of a polymer resulting from the polymerization in a hydrocarbon solvent of 97.5 to 99.8% by weight of acrylic acid and 0.2 to 2.5% by weight of a polyallyl polyether of a polyhydric alcohol containing more than one allyl ether group per molecule and made from a parent polyhydric alcohol containing at least 4 carbon atoms and at least 3 hydroxyl groups and (B) an amount of solid, water-soluble monovalent alkali metal hydroxide sufficient to neutralize said acid form polymer to the extent of 25 to 85%.

14. A substantially anhydrous granular mucilage-forming composition comprising (A) particles of a water-insoluble, water-sensitive acid form of a polymer resulting from the polymerization in benzene at 0 to 100° C. of a monomeric mixture consisting of 97.5 to 99.8% by weight of acrylic acid and 0.2 to 2.5% by weight of a polyallyl polyether of an oligosaccharide containing at least two allyl ether groupings per molecule and (B) an amount of a granular alkali-metal hydroxide sufficient to neutralize said acid form polymer to the extent of 25 to 85%.

15. A substantially anhydrous, granular, mucilage-forming composition comprising (A) dry particles of a water-insoluble, water-sensitive acid form of a polymer resulting from the polymerization in benzene at 0 to 100° C. of a monomeric mixture consisting of 97.5 to 99.8% by weight of acrylic acid and 0.2 to 2.5% by weight of a polyallyl polyether of sucrose containing at least two allyl ether groupings per molecule and (B) an amount of a granular sodium carbonate sufficient to neutralize said acid form polymer to the extent of 25 to 85%.

16. A smooth, non-grainy mucilaginous composition comprising (A) water, (B) a water-swollen but water-insoluble, gel-forming carboxylic interpolymer of a monomeric mixture comprising (1) at least 25% by weight of an alpha,beta-monoolefinically unsaturated aliphatic carboxylic acid having from 3 to 4 carbon atoms, (2) up to 75% by weight of a different monoolefinic monomer copolymerizable with said acid and (3) not less than 0.1% nor more than 6.0% by weight based on the total polymerizable material of a cross-linking agent selected from the class consisting of polyallyl ethers of parent polyhydric alcohols having at least 4 carbon atoms and at least three alcoholic OH groups, hexaallyl trimethylene trisulfone, allyl beta-allyloxy propionate, methylene bis-acrylamide, methylene bis-methacrylamide, 1,3,5-triacrylyl triazine, and triallyl cyanurate, said polymer having been made of polymerization in an inert hydrocarbon solvent having substantially no swelling action and substantially no solvent action on the polymer, and (C) sufficient of a water-soluble monovalent base to neutralize 25 to 85% of the carboxylic groups in said carboxylic polymer, the polymer salt being present in said composition to the extent of 0.1 to 10% on a dry weight basis and in a colloidally dispersed condition.

17. A smooth, non-grainy mucilaginous composition comprising (A) water, (B) a water-swollen but water-insoluble gel-forming carboxylic polymer made by the polymerization at 0 to 100° C. in an inert hydrocarbon solvent having substantially no swelling action and substantially no solvent action on the polymer and in the presence of a solvent soluble peroxygen compound of a monomeric mixture comprising (1) at least 25% by weight of an alpha,beta-monoolefinically unsaturated aliphatic carboxylic acid having from 3 to 4 carbon atoms, (2) up to 75% of a different monoolefinic monomer copolymerizable with said acid and (3) no less than 0.1% nor more than 4.0% by weight based on the total polymerizable material of a polyallyl polyether of a polyhydric alcohol having at least 2 allyl ether groupings per molecule and which is made from a parent polyhydric alcohol having at least 4 carbon atoms and at least 3 hydroxyl groups and (C) sufficient amount of a water-soluble monovalent base to neutralize 25 to 85% of the carboxyl groups in the carboxylic polymer, the partial polymer salt being present in said composition to the extent of .2 to 5% on a dry weight basis and in a colloidally dispersed condition.

18. A smooth, non-grainy mucilaginous composition comprising (A) water, (B) a water-swollen but water-insoluble, gel-like carboxylic polymer made by the polymerization at 30 to 85° C. in an inert hydrocarbon solvent having substantially no swelling action and substantially no solvent action on the polymer, and in the presence of a solvent-soluble peroxygen compound, of a monomeric mixture comprising (1) at least 40% by weight of an acrylic acid of the structure

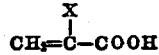

wherein X is selected from the class consisting of hydrogen and a methyl group, (2) up to 60% of a monoolefinic monomer copolymerizable with said acid, and (3) not less than 0.2% nor more than 2.5% by weight based on the total polymerizable material of a polyallyl polyether of an oligosaccharide containing at least two allyl ether groups per molecule, and (C) sufficient of a water-soluble monovalent alkali to neutralize 25 to 85% of the carboxyl groups in said carboxylic polymer, the partial polymer salt being present in said composition to the extent of 0.2 to 5% on a dry weight basis and in a colloidally dispersed condition.

19. A smooth, non-grainy mucilaginous composition comprising (A) water, (B) a water-swollen but water-insoluble, gel-forming polymer made by polymerization at 0–100° C. in an inert hydrocarbon solvent having substantially no swelling action and substantially no solvent action on the polymer and in the presence of a free radical catalyst of a monomeric mixture comprising at least 40% by weight of acrylic acid, up to 60% of a monoolefinic monomer copolymerizable with said acid and not less than 0.2% by weight nor more than 2.5% by weight of the total polymerizable material of a polyallyl polyether of sucrose containing at least two allyl ether groupings per molecule, and (C) sufficient of an alkali hydroxide to neutralize 25 to 85% of the carboxyl groups in said carboxylic polymer, the said partial alkali polymer salt being present in said composition to the extent of 0.2 to 5% on a dry weight basis and in a colloidally dispersed condition.

20. A smooth, non-grainy mucilaginous composition comprising (A) water, (B) a water-swollen but water-insoluble, gel-forming polymer made by polymerization at 0–100° C. in an inert hydrocarbon salt having substantially no swelling action and substantially no solvent action on the polymer and in the presence of a free radical catalyst of 96 to 99.9% by weight of acrylic acid and not less than 0.2% by weight nor more than 2.5% by weight of the total polymerizable material of a polyallyl polyether of sucrose containing at least two allyl ether groups per molecule, and (C) sufficient sodium hydroxide to neutralize 25 to 85% of the carboxylic groups in said carboxylic polymer, the partial sodium polymer salt being present in said composition to the extent of 0.2 to 5% on a dry weight basis and in a colloidally dispersed condition.

References Cited in the file of this patent

UNITED STATES PATENTS

| | | |
|---|---|---|
| 2,205,882 | Graves | June 25, 1940 |
| 2,244,703 | Hubbuch | June 10, 1941 |
| 2,265,640 | Garvey | Dec. 9, 1941 |
| 2,336,985 | Freund | Dec. 14, 1943 |
| 2,409,633 | Kropa | Oct. 22, 1946 |
| 2,541,142 | Zief et al. | Feb. 13, 1951 |
| 2,731,408 | Clarke | Jan. 17, 1956 |
| 2,798,053 | Brown | July 2, 1957 |

UNITED STATES PATENT OFFICE

CERTIFICATE OF CORRECTION

Patent No. 2,923,692            February 2, 1960

Joseph F. Ackerman et al.

It is hereby certified that error appears in the printed specification of the above numbered patent requiring correction and that the said Letters Patent should read as corrected below.

Column 15, line 71, for "75%" read -- .75% --; column 20, line 1, for "polymerize" read -- polymerizes --; line 38, in the table, Example XXIII, under the heading "Parts by Weight", for "62 8" read -- 62.8 --; column 23, line 19, for "small" read -- smaller --.

Signed and sealed this 22nd day of November 1960.

(SEAL)
Attest:

KARL H. AXLINE                      ROBERT C. WATSON

Attesting Officer                 Commissioner of Patents